United States Patent [19]

Brandt

[11] Patent Number: 4,543,450

[45] Date of Patent: Sep. 24, 1985

[54] INTEGRATED CONNECTOR AND MODEM

[76] Inventor: Randy Brandt, 1607 Dressage, Orange, Calif. 92669

[21] Appl. No.: 571,867

[22] Filed: Jan. 18, 1984

Related U.S. Application Data

[63] Continuation-in-part of Ser. No. 433,817, Jan. 3, 1983, abandoned.

[51] Int. Cl.⁴ .......................................... H04M 11/00
[52] U.S. Cl. .................................................... 179/2 C
[58] Field of Search .................... 179/2 C, 2 DP, 184, 179/186; 375/8, 9

[56] References Cited

U.S. PATENT DOCUMENTS 4,367,374  1/1983  Serrano ................................. 179/2 C
4,395,590  7/1983  Pierce et al. ......................... 375/8 X

OTHER PUBLICATIONS

Artwick, B. A., *Microcomputer Interfacing*, Prentice-Hall, N.J., 1980, pp. 288-292.

*Primary Examiner*—Gene Z. Rubinson
*Assistant Examiner*—W. J. Brady
*Attorney, Agent, or Firm*—K. H. Boswell; Edward D. O'Brian

[57] ABSTRACT

A data communication device which includes a terminal housing having a terminal connector forming a part thereof, with a modem located in the housing so as to be physically and electrically connected to a data terminal or computer when the terminal connector is connected to the data terminal or computer. A telephone cable having a plug means at one end so as to connect to a modular telephone is connected via its other end to the housing so as to be electrically connected to the modem.

8 Claims, 5 Drawing Figures

INTEGRATED CONNECTOR AND MODEM

CROSS REFERENCE TO RELATED APPLICATION

This application is a continuation in part of my application Ser. No. 433,817, abandoned filed Jan. 3, 1983, and entitled, "Instacom Modem Cable", the entire disclosure of which is herein incorporated by reference.

BACKGROUND OF THE INVENTION

This invention relates to a data communication device which includes a terminal housing having a terminal connector forming a part thereof, with a modem located in the housing so as to be physically and electrically connected to a data terminal or computer when the terminal connector is connected to the data terminal or computer. Further, a telephone cable having a plug means at one end so as to connect to a modular telephone is connected via its other end to the housing so as to be electrically connected to the modem.

Data communication modems (hereinafter referred to as modems) are well known. These devices are utilized to transfer digital information between separated data terminals or computers by transferring the digital information over a phone line or the like. This is done by utilizing digital modulated analog carrier frequencies to carry the digital signals. Modem transmission techniques are described for example, in Bennett et al, "Data Transmission", McGraw Hill, 1975.

One commonly used modem utilizes acoustic coupling between the modem and the hand set of the telephone to acoustically exchange modulated carrier signals between the modem and the telephone hand set.

A further modem utilizes a housing which is located near a data terminal or computer and couples with the data terminal and computer via a ribbon cable having an appropriate connector on the end. A further connection then is made between the modem housing and a telephone. This modem requires an external power source which normally entails the use of a transformer to step down the voltage from a common electrical line to the voltage which is utilized to drive the modem.

As data communication systems become more complex, it has become desirable and necessary to reduce the physical size of the same, to reduce the power consumption of the same, and to reduce the number of components so as to reduce the cost and complexity of the device.

BRIEF DESCRIPTION OF THE INVENTION

In view of the above, it is a broad object of this invention to provide a data communication modem having a reduction in the number of components thus reducing size, costs and power consumption. It is a further object of this invention to provide a modem which is directly attachable to a data terminal or computer so as to eliminate the necessity of having a separate component box which must be physically located close to but separate from the data terminal or computer, taking up valuable shelf space, desk space or the like. Further it is an object of this invention to provide a modem which can be powered directly utilizing the power supply of the data terminal or computer or of a telephone set.

These and other objects, as will become evident from the remainder of this specification are achieved in a data communication device which comprises: a connector housing; a terminal connector located on said connector housing for physically and electrically connecting said connector housing to an input/output interface port of a data terminal or a computer; said connector housing sized and shaped so as to be supportable on said interface port by said terminal connector; modem means located in said connector housing in direct electrical association with said terminal connector; a phone cable having ends, one of said ends attachable to said connector housing in electrical association with said modem means, the other of said ends including a phone connector plug means for electrically connecting said cable to a modular telephone set.

In the preferred embodiment of the invention, a data communication modem is provided which is miniaturized, utilizes low voltage power and is directly formed as a part of a 25 pin "D" connector such that it can be connected directly to a data terminal or computer. Further, the phone cable can utilize a USOC plug for direct connection to the hand set port of a standard modular telephone set. This allows direct connection to the telephone set, eliminating distortion effects caused by acoustics and also eliminates interferences caused by ambient noise and the like.

DETAILED DESCRIPTION OF THE DRAWINGS

This invention will be better understood when taken in conjunction with the drawings wherein.

Figure 1:
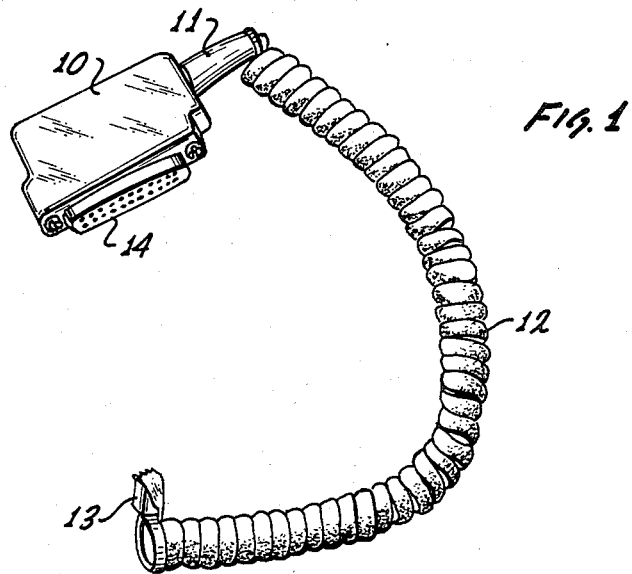
FIG. 1 is a plan view of the modem of this invention.

The invention described in this specification and shown in the drawings utilizes certain principles and/or concepts as are set forth in the claims appended to this specification. Those skilled in the electronic arts will realize that these principles and/or concepts are capable of being utilized in a variety of embodiments which may differ from the embodiment utilized for illustrative purposes herein. For this reason, this invention is not to be construed as being limited to only the illustrative embodiment, but is only to be construed as being limited by the claims.

DETAILED DESCRIPTION OF THE INVENTION

In FIG. 1, an embodiment of the invention is shown which utilizes low power electronic modem circuits packaged as a microcircuit so as to be directly connectable to a data terminal or computer. The modem of the embodiment of FIG. 1 utilizes a housing 10 which accepts a jack 11 attached to one end of a phone cable 12 which has a USOC plug 13 at its other end. Located on the housing 10 is common 25 pin (D) connector, such as an RS-232-C connector. This embodiment is such that the RS-232-C connector 14 can be directly attached to an input/output interface port of a data terminal or computer with the housing 10 then physically connected to the interface port by the connector 14.

Located within the interior of the housing 10 is a modem 18. Because the connector 14 and the housing 10 are assembled as a single unit with the modem 18 located in the housing 10, when the connector 14 is attached to the data terminal or computer, this directly physically and electrically attaches the modem 18 to the data terminal or computer. This eliminates the necessity of having a separate independent structure to house the modem 18 thus decreasing the complexity of a communications system.

The jack 11 makes an appropriate electrical connection between the cable 12 and the modem 18. The USOC plug 13 can then be connected to the hand set plug of a modular telephone set.

The cable 12 is shown as a common stretch cable which allows for linkage of the housing 10 after it is connected via the connector 14 to an input/output connecting port of a data terminal or computer with an appropriate telephone set. By utilizing the embodiment of FIG. 1, the cable 12 is the only hardware necessary to connect the data terminal or computer to the telephone set. This is in contrast to commonly utilized modems wherein, in addition to a cable connecting to the telephone set, a further flat ribbon cable must be utilized to connect to the data terminal or computer and a power cord must be connected to the modem for supplying power thereto.

For the embodiment of FIG. 1, one of the pins on the connector 14 is matched to an appropriate socket in the interface port of the data terminal or computer which is connected to an appropriate power supply within the data terminal or computer so as to supply electrical power to the modem 18. This eliminates the need of having an external power cord to supply power to the modem 18. Alternatively, power could be fed to the modem 18 via cable 12 from the transmitter (microphone) side of the telephone set 16. It is preferred however, to supply power via the connector 14.

Figure 2:
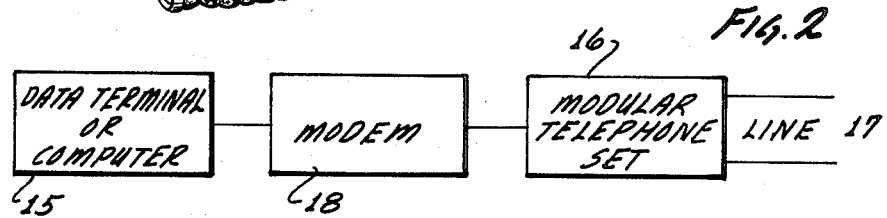
FIG. 2 is a diagrammatic view showing a functional data communication systems utilizing the modem of FIG. 1.
Figure 3:
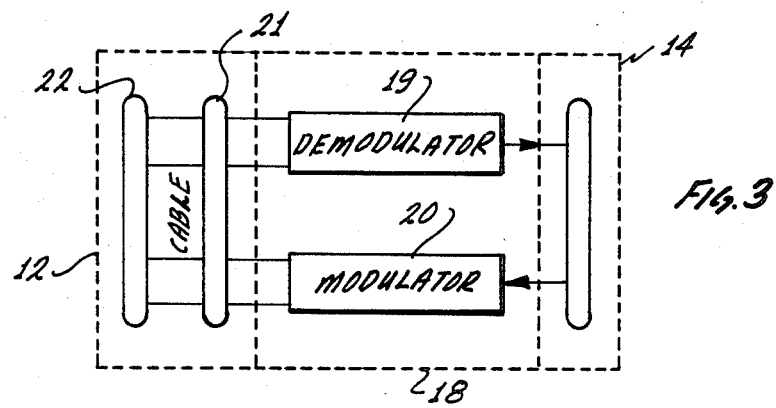
FIG. 3 is an electrical schematic of the modem of FIG. 1.

In FIGS. 2 and 3, a communications system is shown in FIG. 2 which utilizes the modem of FIG. 1 with the schematic of the modem of FIG. 1 then shown in FIG. 3. A common telephone line 17 feeds a modular telephone set 16 which is connected to the modem 18, with the modem 18 then being connected to the data terminal or computer. The lines 21 and 22 within the cable 10 are appropriately connected to a demodulator 19 and a modulator 20 located within the modem 18. These are then connected to appropriate pins or the like, designated by the numeral 23, within the connector 14.

Incoming and outgoing data modulated carrier signals terminate and originate, respectively, at the modem 18. The information bearing modulated carrier signals are either detected for incoming transmission from the telephone 16 or generated for outgoing transmissions from a data source such as a computer or data terminal 15.

To transfer data using the system of this invention, the modulated carrier signals enter and exit the modem 18 through the telephone set 16 utilizing the cord and plug assembly 12 and 13, respectively.

Figures 4A, 4B:
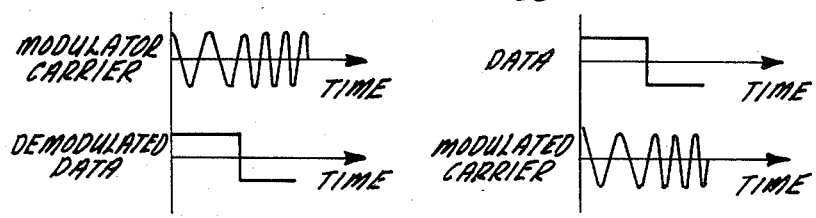
FIG. 4 shows the relationship between input/output data and carrier components utilized by the modem of FIG. 1 for transferring data.

An inbound modulated carrier (similar to FIG. 4A) would enter the system from the telephone or communications network 17 through the telephone set 16 which projects the modem from line hazards, and provides the necessary coupling and impedance matching. The carrier signal is then transmitted to the USOC plug 13 and cable 12 into the demodulator 19 of the modem 18 which is inside the connector housing 10. The demodulator 19 interrogates the carrier signal and reconstructs an exact replica of the data being sent over the telephone network 17 by the modulated carrier signal which originated at another location. This data (FIG. 4A) presents itself on a single output pin on connector 14 which is connected to the receiving computer or data terminal 15.

When the data transmission is to be generated at the computer or data terminal 15, the data from the computer or data terminal 15 is presented to a single pin on modem connector 14 different from the receive data pin. The data is then transmitted to the modulator 20 also located inside of the connector housing 10. The modulator 20 generates a suitable carrier signal (FIG. 4B) for transmission. The data modulated carrier signal is then transmitted to the telephone set 16 through cable 12 and plug 13. This signal is then coupled by the telephone set 16 to the telephone network 17.

I claim:
1. A data communication device which comprises:
 a connector housing;
 a portion of said connector housing forming a terminal connector for physically and electrically connecting said connector housing to an input/output interface port of a data terminal or a computer;
 together said connector housing and said terminal connector sized and shaped so as to be supportable on said interface port by said terminal connector;
 a modem means sized and shaped so as to be located in the interior of said connector housing in direct electrical association with said terminal connector;
 a phone cable having ends, one of said ends attachable to said connector housing in electrical association with said modem means, the other of said ends including a phone connector plug means for electrically connecting said cable to a modular telephone set.
2. The device of claim 1 wherein:
 said device further includes a power supply connecting means for supplying electrical power to said modem means.
3. The device of claim 2 wherein:
 said power supply connecting means comprises said terminal connector including a power connector means located on said terminal connector so as to be connectable to said data terminal or computer to receive electrical power from said data terminal or computer.
4. The device of claim 1 wherein:
 said terminal connector comprises a 25 pin "D" connector.
5. The device of claim 4 wherein:
 said 25 pin "D" connector comprises an RS-232-C connector.
6. The device of claim 5 wherein:
 at least one of said pins of said RS-232-C connector is electrically coupled between said data terminal or computer and said modem means when said terminal connector is connected to said interface port of said data terminal or computer so as to supply electrical power from said data terminal or compute to said modem means.
7. The device of claim 1 wherein:
 said phone connector plug means comprises a USOC modular plug.
8. The device of claim 5 wherein:
 said phone connector plug means comprises a USOC modular plug.

* * * * *